(12) United States Patent
Chen et al.

(10) Patent No.: US 12,229,039 B2
(45) Date of Patent: Feb. 18, 2025

(54) ON-DEMAND CONTEXTUAL TRACE LOG GENERATION

(71) Applicant: SAP SE, Walldorf (DE)

(72) Inventors: Wei Chen, Shanghai (CN); Wenbing Duan, Shanghai (CN); Xudong Liu, Shanghai (CN); Tianhao Liu, Shanghai (CN); Xiang Fan, Shanghai (CN); Jia Wang, Shanghai (CN)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 17/891,289

(22) Filed: Aug. 19, 2022

(65) Prior Publication Data

US 2024/0061762 A1   Feb. 22, 2024

(51) Int. Cl.
G06F 11/36      (2006.01)

(52) U.S. Cl.
CPC ...... *G06F 11/3636* (2013.01); *G06F 11/3624* (2013.01); *G06F 11/3692* (2013.01)

(58) Field of Classification Search
CPC ............. G06F 11/3636; G06F 11/3624; G06F 11/3692

(Continued)

(56) References Cited

U.S. PATENT DOCUMENTS 5,872,909 A * 2/1999 Wilner ................ G06F 11/3664
                                                714/E11.212
8,347,269 B2 * 1/2013 Lazzaro .............. G06F 11/3636
                                                717/128

(Continued)

FOREIGN PATENT DOCUMENTS

| CN | 117435505 A | * | 1/2024 | |
|---|---|---|---|---|
| WO | WO-2015071777 A1 | * | 5/2015 | .......... G06F 11/3409 |
| WO | WO-2021068547 A1 | * | 4/2021 | |

OTHER PUBLICATIONS

Vladimir Topias Kramar "Tool for grouping test log failures using string similarity algorithms"; University of Helsinki Faculty of Science—Master's thesis Master's Programme in Data Science, Sep. 25, 2022.*

(Continued)

*Primary Examiner* — Francisco J Aponte
(74) *Attorney, Agent, or Firm* — Fountainhead Law Group, PC

(57) ABSTRACT

Computer-readable media, methods, and systems are disclosed for automatic generation of dynamic application trace logs associated with a running application. A log viewer presents application log entries associated with an application execution log having been generated in connection with a previous execution of the running application. The application execution log is analyzed to identify application execution log context descriptors. The application execution log context descriptors are extracted from the application execution log. The application execution log context descriptors are transmitted to the running application. Matching templates that match each of the one or more application execution log context descriptors are received from the running application. The tracing templates that have an associated context relevance score are received from the running application. Finally, the log viewer displays the tracing templates based on the associated context relevance score and starts a trace based on a selected tracing template.

17 Claims, 6 Drawing Sheets

(58) Field of Classification Search
USPC .......................................................... 717/128
See application file for complete search history.

(56) References Cited

U.S. PATENT DOCUMENTS

| | | | | |
|---|---|---|---|---|
| 8,490,064 | B2* | 7/2013 | Shrivastava | G06F 11/079 |
| | | | | 717/130 |
| 8,997,057 | B1* | 3/2015 | Diwan | G06F 11/3409 |
| | | | | 717/124 |
| 9,111,031 | B2* | 8/2015 | Wisnovsky | G06F 11/3664 |
| 9,164,878 | B2* | 10/2015 | Kosuda | G06F 11/3676 |
| 9,417,993 | B2* | 8/2016 | Gataullin | G06F 11/3672 |
| 9,582,398 | B1* | 2/2017 | Elliott | G06F 11/3664 |
| 9,665,474 | B2* | 5/2017 | Li | G06F 9/505 |
| 9,772,927 | B2* | 9/2017 | Gounares | G06F 3/0484 |
| 9,864,672 | B2* | 1/2018 | Seto | G06F 11/3466 |
| 10,394,691 | B1* | 8/2019 | Cole | G06F 11/079 |
| 10,467,117 | B2* | 11/2019 | Wilding | G06F 11/302 |
| 10,540,259 | B1* | 1/2020 | Kramer | G06F 11/3636 |
| 10,628,280 | B1* | 4/2020 | Reeves | G06F 11/3017 |
| 10,642,721 | B2* | 5/2020 | Kulkarni | G06F 11/3688 |
| 10,649,749 | B1* | 5/2020 | Brooker | G06F 11/3624 |
| 10,949,338 | B1* | 3/2021 | Sirianni | G06N 20/10 |
| 11,157,386 | B2* | 10/2021 | Chen | G06F 11/3636 |
| 11,243,869 | B2* | 2/2022 | Mola | G06F 11/3636 |
| 11,307,966 | B2* | 4/2022 | Odnopozov | G06F 11/366 |
| 11,928,014 | B1* | 3/2024 | Agarwal | G06F 16/252 |
| 11,940,895 | B2* | 3/2024 | Poghosyan | G06F 11/0793 |
| 2007/0143795 | A1* | 6/2007 | Tran | G06F 11/3636 |
| | | | | 725/35 |
| 2011/0154296 | A1* | 6/2011 | Marenco | G06F 11/3636 |
| | | | | 717/128 |
| 2012/0054675 | A1* | 3/2012 | Rajamannar | G06F 11/3476 |
| | | | | 715/809 |
| 2013/0160128 | A1* | 6/2013 | Dolan-Gavitt | G06F 21/552 |
| | | | | 726/25 |
| 2015/0067654 | A1* | 3/2015 | Seto | G06F 21/31 |
| | | | | 717/128 |
| 2015/0254163 | A1* | 9/2015 | Baril | G06F 11/3636 |
| | | | | 714/38.1 |
| 2016/0019133 | A1* | 1/2016 | Forgács | G06F 11/3612 |
| | | | | 717/128 |
| 2016/0092336 | A1* | 3/2016 | Atanasiu | G06F 8/38 |
| | | | | 717/133 |
| 2016/0301561 | A1* | 10/2016 | Petersen | G06F 11/3495 |
| 2018/0239661 | A1* | 8/2018 | Duffee-Braun | G06F 11/079 |
| 2019/0324891 | A1* | 10/2019 | Mola | G06F 11/3636 |
| 2019/0340103 | A1* | 11/2019 | Nelson | G06F 11/3624 |
| 2019/0370160 | A1* | 12/2019 | Raman | G06F 11/3664 |
| 2020/0110687 | A1* | 4/2020 | Hu | G06F 11/3013 |
| 2020/0233779 | A1* | 7/2020 | Kroehling | G06F 11/3636 |
| 2021/0026646 | A1* | 1/2021 | Jha | G06F 9/3891 |
| 2021/0216433 | A1* | 7/2021 | Mola | G06F 11/323 |
| 2021/0216437 | A1* | 7/2021 | Mola | G06F 11/323 |
| 2021/0224084 | A1* | 7/2021 | Molchanov | G06F 9/451 |
| 2021/0248023 | A1* | 8/2021 | Brown | G06F 11/302 |
| 2023/0244593 | A1* | 8/2023 | Wu | G06F 11/3676 |
| | | | | 717/128 |
| 2024/0289256 | A1* | 8/2024 | K | G06F 11/364 |

OTHER PUBLICATIONS

Jeanderson Cândido et al. "Log-based software monitoring: a systematic mapping study"; Peer J Computer Science: Department of Software Technology, Delft University of Technology, Delft, Netherlands—Adyen N.V., Amsterdam, Netherlands; May 6, 2021.*

* cited by examiner

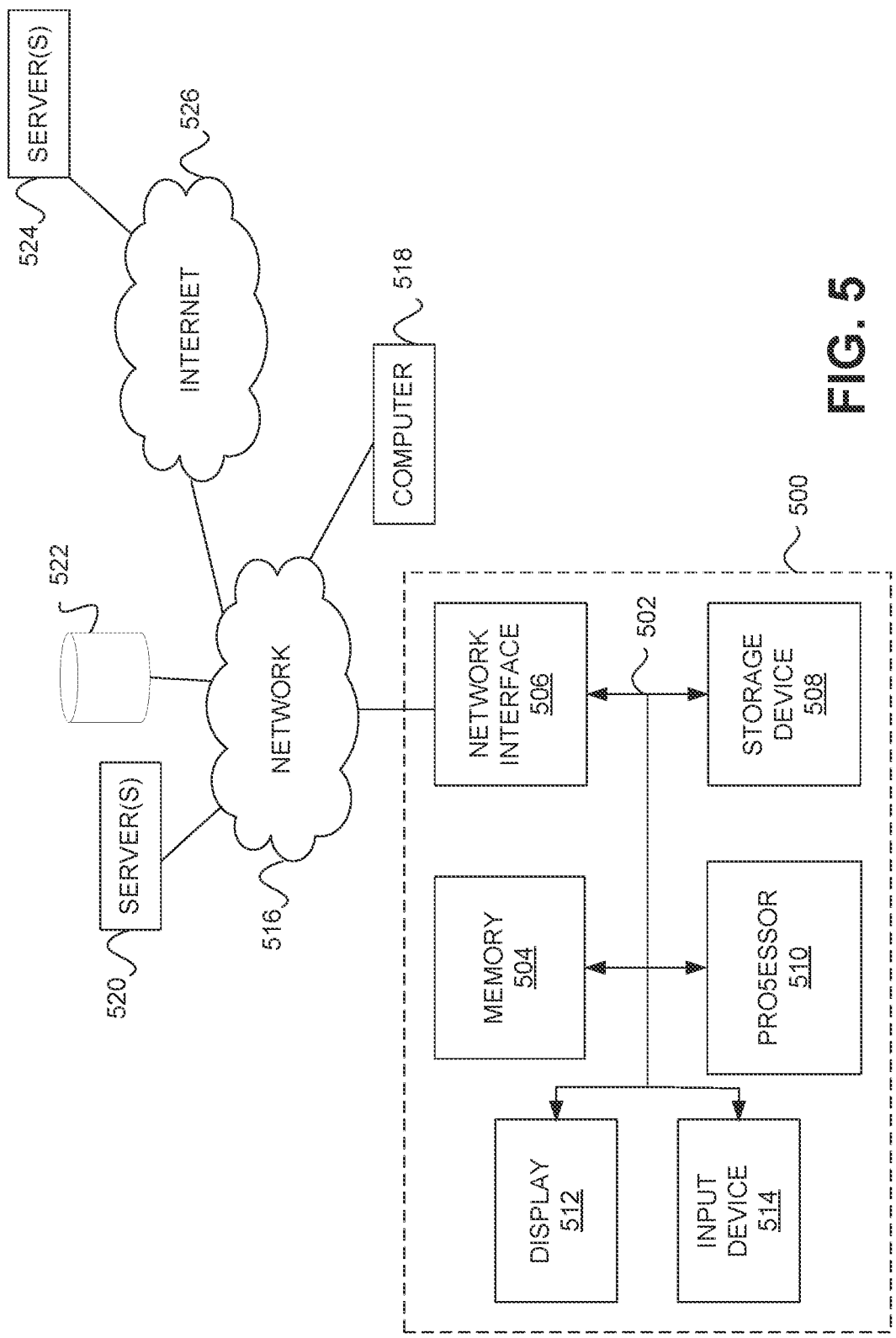

ON-DEMAND CONTEXTUAL TRACE LOG GENERATION

TECHNICAL FIELD

Embodiments generally relate to on-demand trace log generation, and more particularly to facilitating automatic generation of dynamic application trace logs in a secure and application scope-limited manner.

Troubleshooting of running software applications is important across entire software application lifecycles. Locally, in the sense of where an application is developed by a software application provider, native software debuggers can be useful in identifying defects or sub-optimal execution aspects of the software application. However, once a software application is delivered to a non-local environment, such as an integration testing, staging, demonstration, or production environment, native debugging may not be feasible. As a result, software developers and remediators are left with a few principal options. As a first matter, the software developer may attempt to reproduce a problem locally in a development or test system. Alternatively, the software developer may try to find some clues in an application log that may be captured from a deployed execution environment. Both approaches suffer from certain limitations. Firstly, certain issues may not be locally reproduceable. Complex software applications are typically composed of a numerosity of modules which may have inputs from and be integrated with various different technical sources from various entities or organizations. Any attempt to reproduce an equivalent environment locally may be extremely time-consuming. On the other hand, in the era of microservices, it may be costly for a team working on a particular module to set up services that are able to reproduce issues locally. With respect to the second approach, important aspects of software execution may not be output into execution logs, either because developers did not think to establish execution logging for certain aspects of execution or because any such extensive execution logging may have performance or security consequences. Adding additional traditional logging output may either require application changes that would consume developer time and/or resources to modify and deploy new running code. Moreover, any such modified code would need to be tested, and a new version delivered resulting in a scheduled upgrade and potential restart to generate outputs associated with newly added logging statements. Restarting applications may not even be feasible in some environments and/or situations.

Tracing tools such as BTrace are widely accepted as powerful tools to generate logs on-demand for deployed applications. Software developers may write BTrace scripts to trace JAVA methods. However, software developers must nevertheless author and employ such scripts with great care in order to avoid certain problems, such as security problems that may manifest themselves in various ways. In theory, software developers may write scripts to trace any method within the software application. In order not to risk exposure of sensitive information such an approach is generally not allowed in an entity having certain data security requirements. Any such generated log may not be managed and/or deleted in a reliable manner that would be consistent with the associated data security requirements. Moreover, any such scripts that may be written on the fly and not be regularly maintained may not be safely or easily be reused by other software developers. As dependent modules of a software application evolve, such scripts may also need to evolve to reflect associated changes. In a multi-tenant application, the impact scope must be limited to the tenant who reports the issue for data security issues. Accordingly, what is needed is a mechanism for automatic generation of dynamic application trace logs in a secure and application scope-limited manner, thereby addressing the above-mentioned problems.

SUMMARY

Disclosed embodiments address the above-mentioned problems by providing one or more non-transitory computer-readable media storing computer-executable instructions that, when executed by a processor, perform a method for automatic generation of dynamic application trace logs, the method comprising: presenting, by a log viewer, a plurality of application log entries associated with an application execution log, the application log having been generated in connection with a previous execution of an application, analyzing the application execution log to identify one or more application execution log context descriptors, extracting the one or more application execution log context descriptors from the application execution log, transmitting the one or more application execution log context descriptors to the running application, receiving from the running application one or more matching templates that match each of the one or more application execution log context descriptors, receiving, at the log viewer, one or more tracing templates having an associated context relevance score, and displaying, by the log viewer, the one or more tracing templates based on the associated context relevance score.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 5 is a diagram illustrating a sample computing device architecture for implementing various aspects described herein.

Figure 1:
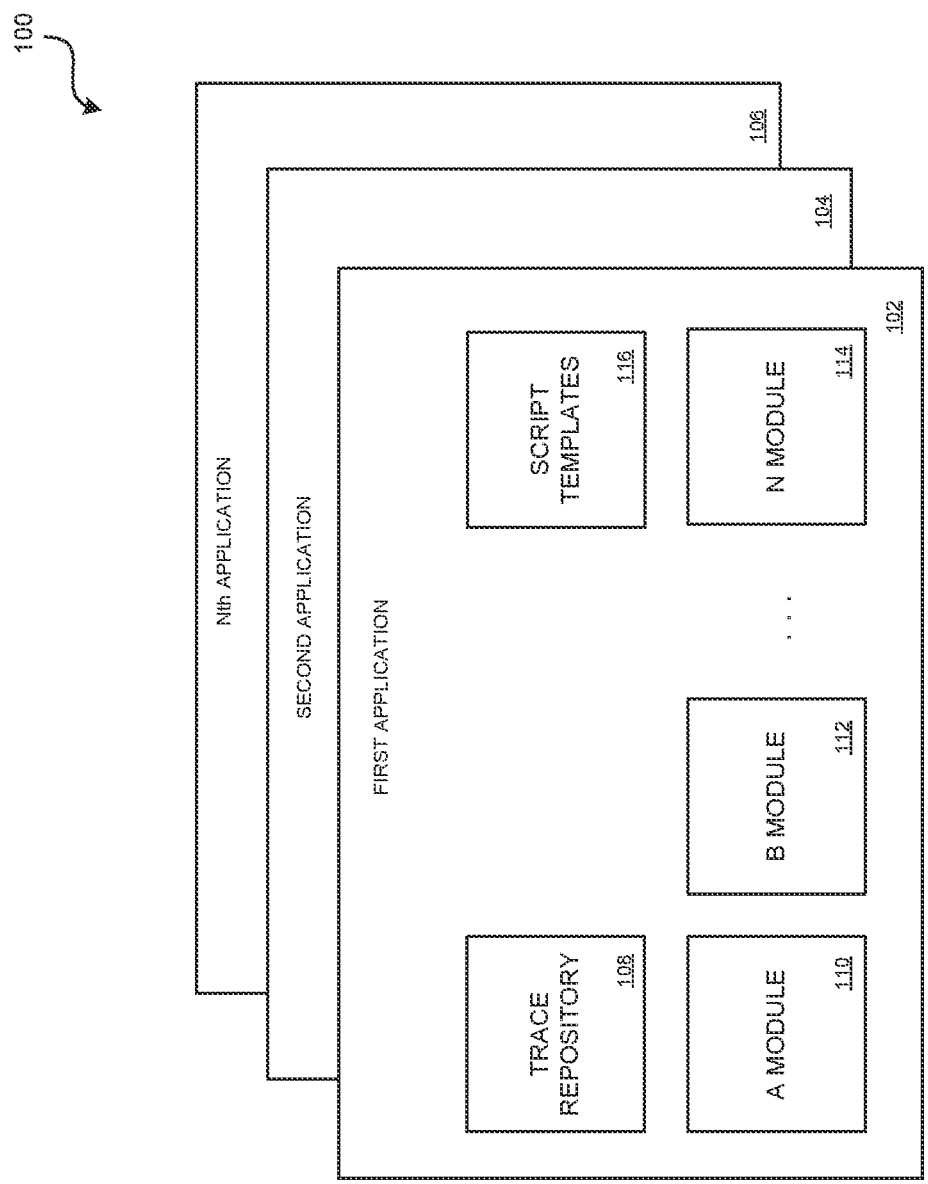
FIG. 1 is a system diagram illustrating an example set of applications for which automatic generation of dynamic application trace logs may be facilitated.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Debugging solutions consistent with the present teachings provide for dynamically generating usable trace logs, on-demand and in a safe and scope-limited way. Instead of requiring software developers to manually write debugging scripts, such scripts may be generated in a guided and automatic way. Systems consistent with the present teachings enable several features. First, the disclosed debugging techniques enable an application and associated modules to define which classes and which methods can be traced. Additionally, the disclosed techniques allow the application and modules to provide script templates to facilitate discovery for software developers and software defect remediators to debug the application. Such templates may provide matching strategies to allow the templates to be automatically proposed based on a segment or other fragment of an application execution log that may be provided to enable corresponding automatic proposals. Templates may employ a tenant scope flag to allow a script generator to inject a tenant scope checking fragment to facilitate enforcing tenant-specific access.

To further enforce data access security and scope limitation, freehand scripts may be restricted so that script and template discovery are performed in connection with a specification of either class, method, or template identifiers that may be provided in connection with initiation of a trace. Based on such inputs, scripts may be generated automatically. In order to carry out automatic script generation, registered templates are collected from a particular application and modules on which the particular application depends. In some embodiments, one or more application programming interfaces (APIs) may be exposed to facilitate automated discovery and use of debugging scripts. In connection with such APIs, relevant segments of an application execution log may be sent via one or more APIs to obtain available and potentially relevant trace templates. Systems consistent with the present teachings may extract necessary context information from the relevant log segments and request available and potentially relevant templates to examine the given context information to decide whether the log segments match a particular log context. Thereafter, matching templates, and corresponding tenants, may be selected and enabled for debugging. Systems consistent with the present teachings automatically generate corresponding scripts and apply them for the purposes of debugging a deployed, live, production application. A corresponding trace log may be collected in a temporary persistency container (such as a temporary file) and such temporary content may be made available only for a predetermined time via one or more APIs.

Compared to permitting ad hoc use of BTrace scripts, methods consistent with the present teachings only permit registered methods and classes to be traced. Such trace logs are only available in a given time window. Such scripts may only be generated based on templates that are vetted and provided in connection with the deployed application. Instead of writing the scripts manually, users only need to provide a piece of the application log to allow the debugging application to suggest and facilitate the selection of matching templates. As templates are provided in connection with the application and corresponding software modules, accuracy of the templates may be verified prior to the application being delivered and deployed. As the tenant flag is enforced in the template and script generation process, the impact is limited to the given tenant only.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

FIG. 1 is a system diagram 100 illustrating an example set of applications for which automatic generation of dynamic application trace logs may be facilitated. Such applications may include first application 102, second application 104, and Nth application 106. Such complex applications are typically made up of a numerosity of modules, such as "A" module 110, "B" module 112, and "N" module 114. Due to advantages associated with code reuse, such modules may be also shared by other applications, i.e., first application 102 and second application 104 may share module 112 and/or additional such shared modules. In this way, shared modules, such as module 112, may be associated with shared templates, such as templates 116, which may facilitate application debugging in an analogous way to the beneficial nature of code reuse. In connection with application development, script templates 116 may be developed to facilitate future application debugging and defect remediation. In some embodiments, trace repository 108 may contain log output associated with application execution traces providing details regarding application execution.

Figure 2:
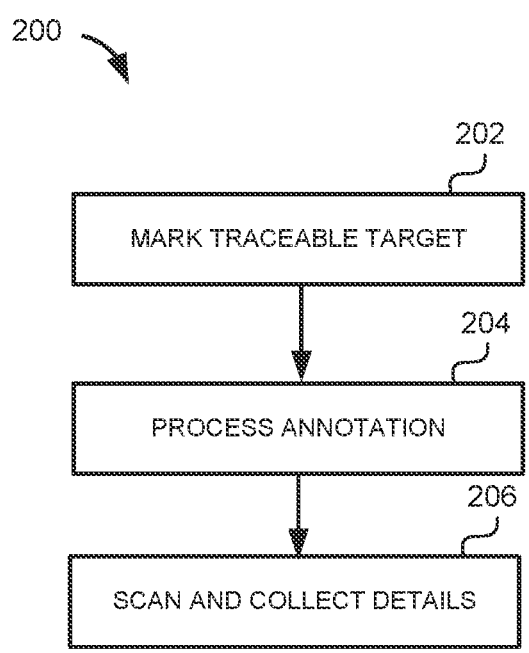
FIG. 2 is a flow diagram illustrating an example method for annotating code to be used for template definition to facilitate automatic generation of dynamic application trace logs.

FIG. 2 is a flow diagram illustrating an example method 200 for annotating code to be used for template definition to facilitate automatic generation of dynamic application trace logs. In various embodiments, processes to provide templates may be defined as follows. Automated debugging mechanisms consistent with the present teachings offer a structured way to mark methods and classes that should be traceable by annotating them with decorators, such as @Tracable and @TraceGroup. @TraceGroup specifies which group a particular element belongs to. At step 202, systems consistent with the present teachings facilitate marking of a traceable target with a decorator. In some embodiments, an example definition of such an annotation is defined as set forth below in the Java programming language:

```
@Target(ElementType.METHOD, ElementType.CLASS)
@Retention(RetentionPolicy.SOURCE)
public @interface Traceable {
    String[ ] groups( );
    String templateName( );
}
@Target(ElementType.METHOD, ElementType.CLASS)
@Retention(RetentionPolicy.SOURCE)
public @interface TraceableGroup {
    String identifier;
}
public interface TraceGroup {
    GroupMatcher getMatcher( );
}
```

In connection with FIG. 2, templateName points to a template which can be used to generate a script. For example, a template named "PrintArguments" may be defined as follows:

```
@BTrace
public class PrintArguments {
    @OnMethod(
        clazz = "${fullyQualifiedClassName}",
        method = "/.*/"
    )
```

Such templates may be provided automatically by systems consistent with the present teachings or defined in code associated with modules themselves. When generating a particular script, the placeholder fullyQualifiedClassName may be replaced with the name of the class annotated with Traceable. The annotation Traceable may specify which element can be traced, and its attribute "groups" may specify one or more TraceableGroups corresponding to a particular class or method. A traceable annotation may be added to any class or method. The annotation TraceableGroup may specify a traceable group. Such an annotation may be added to a concrete class that implements the interface TraceGroup, where the attribute Matcher is a function that can analyze a given trace context and provide a score associated with a degree to which the message is correlated with a particular group.

Next, at step 204, process annotation is performed as follows. In some embodiments, an annotation processor is provided that processes source code during the compile stage of application development. The annotation processor processes annotations such as decorators @Traceable and @TraceableGroup defined above. In some embodiments, such annotations may be provided in connection with source code level annotations that are supported by certain versions of the Java programming language. Annotation processors consistent with the present teachings may first register at the source code compilation stage by creating a resource file that may be placed in a predetermined location consistent with a particular source code development environment. Inside such a file, one or more lines may be provided for each annotation processor. In some embodiments, such a configuration line corresponds to a qualified name of a particular trace processor. Once registered, an annotation processor may be called when a particular source code compiler identifies elements that have been annotated with a set of annotations that have been defined during the compilation phase. Such a method of processing annotations may take place as follows. First, a data structure is initialized by creating a mapping that correlates a group identifier to a particular TraceGroupDefinition. Next, class elements annotated with @TraceableGroup are processed. For each element annotated, a @TraceableGroup annotation is denominated as A1, and the qualified name of the element is denominated as C1. Next, an instance of TraceGroupDefiniiton denominated as G is created. In this context, G.name is defined as A1.idenfiier and G.implement=C1. Finally, TraceGroupDefiniiton G is placed into the map with the key=G.name. As a result, each of the group definitions are assimilated into the mapping. Next, each of the elements annotated with @Traceable are identified. For each element annotated, corresponding @Traceable annotations are associated with a marker A2, and a qualified name of corresponding elements are noted as C2. In this step, a @Traceable element is added to each group defined in the corresponding attribute groups associated with C2.

For each group in the set of groups the following processing is performed. For each group it is determined whether a TraceGroupDefiniton G is found in the mapping with a key associated with the particular group number. Next, a TraceableDefinition D is defined, where D.template is set to A2.template. Next D.class is set to the fully qualified class name of the element such that D.method corresponds to the method name if the element is a method. Next, D is added to the list of G.traceables. Next, a resource file is generated in a subdirectory within the source code build tree. In some embodiments, the resource file is formatted in a yet another markup language (YAML) format within a resources subdirectory of the source code build tree. Next, the java annotation processor is requested to create a new resource file named "traceable.yaml" in the resource folder, where the file may be denominated as "F." Next a writer object is opened to write content to "F," content associated with the map M is output to the file F in yaml format. At step 206, a set of source code files may be scanned and details collected associated with the above-described annotations.

Figure 3A:
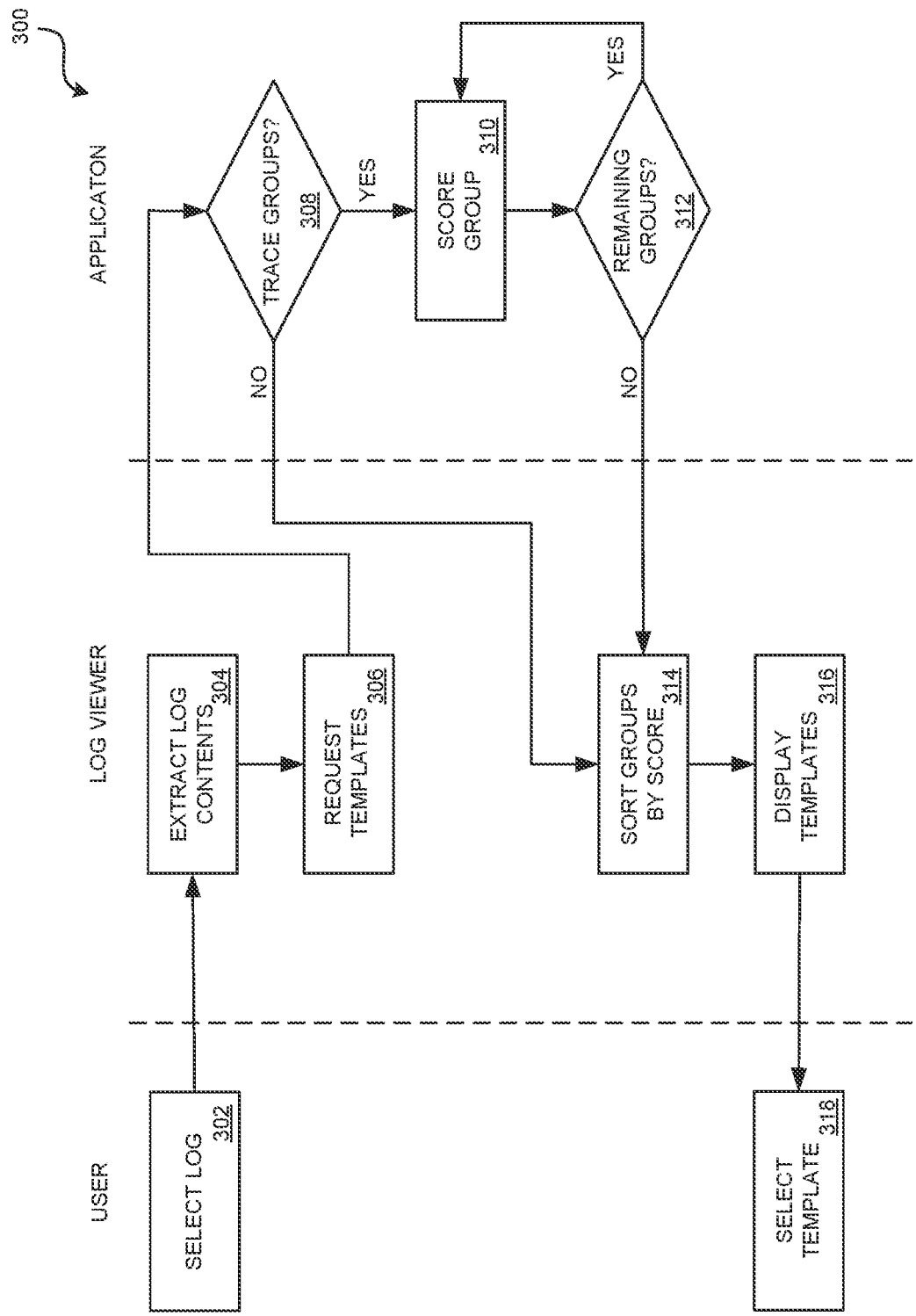
FIGS. 3A and 3B are swim lane diagrams illustrating example methods for automatic generation of dynamic application trace logs.

FIG. 3A is a swim lane diagram 300 illustrating an example method for selecting templates in the automatic generation of dynamic application trace logs. First, at step 302, a user selects portions of an application execution log (log lines or log segments) that may be relevant to an issue that the user is attempting to debug or remediate. In some embodiments, the user may navigate the application execution log using a log viewer tool such as kibana, splunk, or other log viewer tools such as a tool that may be internal to an organization with which the user is associated, such as an organization that provides application development and support services.

In some such embodiments, at step 304, the user may interact with a log viewer tool to extract certain contents of the application execution log, such as a specific error may be raised by providing an error message associated with the issue that is being debugged. The log viewer tool may interactively prompt the user for such options including to generate contextual trace on demand during application execution. To obtain context one or more context descriptors associated with information an application execution log may be analyzed based on context information that may be extracted and sent via an API to a debugger script generating service to request methods that may be available for tracing. Such context information may include a class name associated with a class within a particular application. The context information may also include a tenant identifier, which may identify a tenant within a multitenant application. Finally, the context information may include a particular message associated with one or more log segments. In some embodiments, the extracted log contents may be extracted into a list structure that may be used to iteratively process the extracted log contents. Where the log extraction fails, execution may be returned back to step 302, where the user may again select portions of the application execution log that may be relevant to the issue that the user is attempting to debug or remediate. In some embodiments, an empty collection of templates may be prepared for the next step of requesting templates.

Next, at step 306, based on the extracted log contents, one or more templates may be requested based on context derived from extracting log contents in previous step 304. In some embodiments, a service may receive the request for templates via an API used to request templates based on an execution log context. From step 306, execution continues to test 308, at which point it is determined whether any trace groups are registered. Such a registration may be established at application design time by inserting annotations as described above in connection with FIG. 2.

If at test 308, in response to a determination that no groups are registered, execution continues to step 314. On the other hand, if one or more additional trace groups are registered, execution continues to step 310. At step 310, the current trace group is scored, which is to say that a score is assigned to a current trace group based on context associated with the log segment which is being debugged. In some embodiments, scoring may be inserted by a software development in the form of conditional statements and/or metadata associated with code that is decorated with annotations as described above in connection with FIG. 2. For each context sent to the application (or the trace repository), the application requests each registered trace template to examine the context information provided and provide an indication whether the tracing template is suitable for the context and matching score. By comparing an individual score to a predefined threshold, templates that score below the predetermined threshold may be excluded. Those templates with a score higher than the predetermined threshold may be preserved in a collected list of templates.

Next, execution continues to test 312, at which point it is determined whether there are remaining trace groups to be scored. If yes, execution proceeds back to step 310 at which point a next one of the remaining trace groups is scored, whereupon execution continues back again to test 312. If at test 312, it is determined that there are no remaining trace groups, execution proceeds to step 314.

Next, at step 314, trace groups are sorted according to the scores that were generated in connection with step 310. Next, at step 316 a list of potential templates is displayed in connection with the log viewing software. If no trace groups were present, a single template may be recommended. Where a list of trace groups were identified at the application with a list of associated scores, all associated templates are displayed, potentially in the order of their corresponding trace groups. In some embodiments, the templates may be displayed in descending order, ordered by score. Finally, at step 318, the log viewer may accept a selection of a debug script template from the user, and the template may be used to generate a debugging script.

Figure 3B:
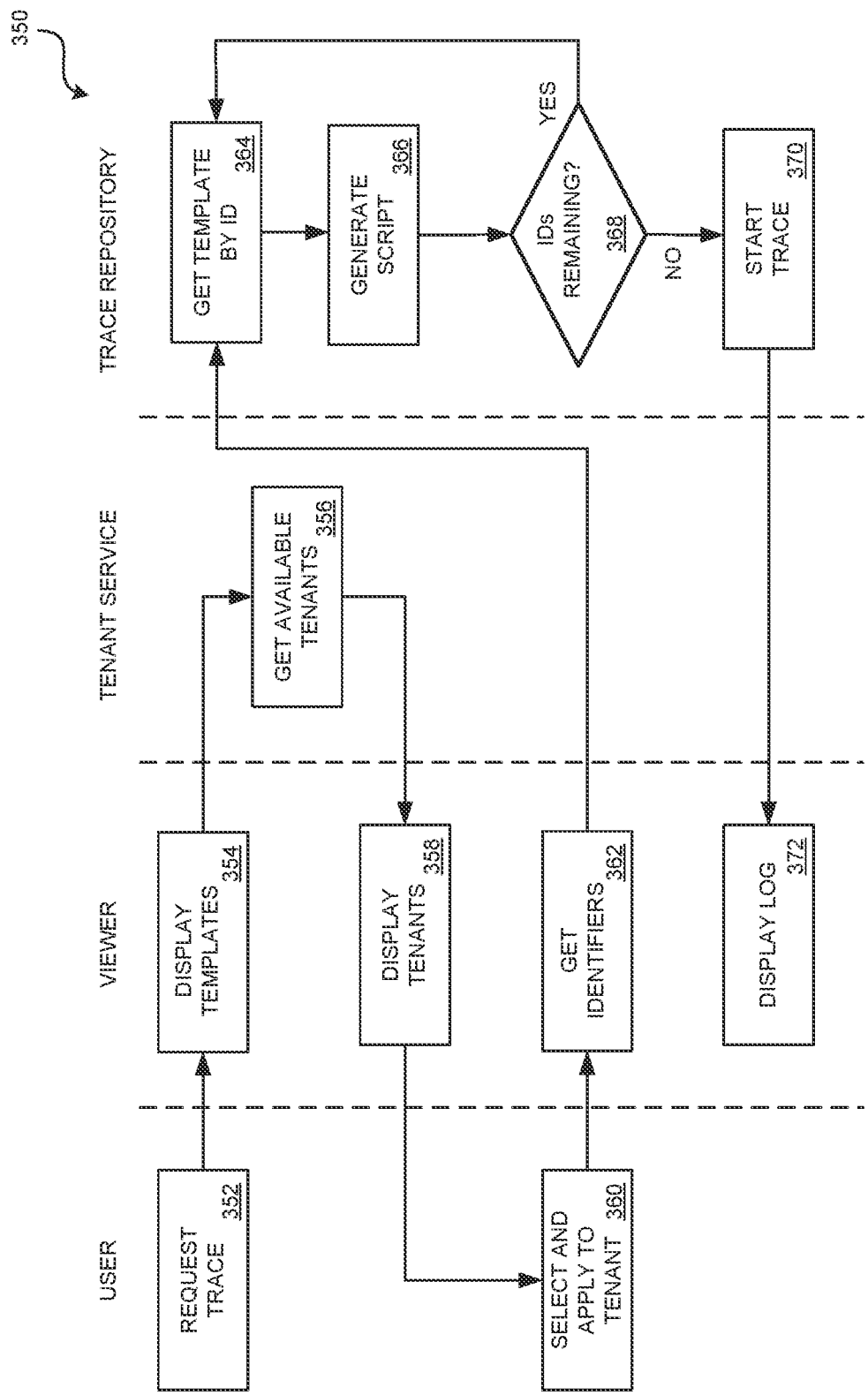

FIG. 3B is a swim lane diagram 350 illustrating an example method for selecting a template for automatically generating dynamic application trace logs. At step 352, a user may interact with a log viewing application that allows the user to select one or more log segments for debugging an application. Next, at step 354, the log viewer application may display one or more templates that the user may select for the automatic generation of dynamic application trace logs. Once the user has selected one or more templates, the viewer may access a tenant service via an API call to determine which tenants may be available to a particular user for debugging. In some embodiments, this tenant service may enforce authorization to ensure that the user who is engaged in interactive debugging has authorization to debug an application with respect to a particular tenant's data. Based on output from the tenant service at step 356, at step 358 the log viewer application may display a list of one or more tenants that are present in a multi-tenant application for which the user has access to debug. From this list of tenants, at step 360, the user may select one or more particular tenants and apply an associated limitation so that production application execution and debugging will occur solely in the context of the selected tenant(s).

Next at step 362, the log viewer application receives a list of identifiers that are filtered down based on the input provided by the user to perform the debugging. This list of identifiers may be filtered based on the one or more templates identified based on the context of the application execution log segments identified in connection with the inputs provided by the user as well as the one or more tenants displayed and selected in connection with steps 356 and 360. From here, execution proceeds to the trace repository, where templates may be obtained. At step 364, a first template may be identified where the trace repository is instructed to get a template by the template's identifier. Next, at step 366, a script is generated based on the template that was obtained at step 364. In some embodiments, the generated script is a BTrace script that may be used to trace and log execution in an Java-based application program.

Next, at test 368, it is determined whether additional template identifiers remain in the collection of template identifiers that were obtained in connection with step 362. If additional identifiers remain, execution proceeds back to step 364 at which point the trace repository will continue to iterate over the collection of identifiers and generate additional scripts by way of step 366. On the other hand, if no additional template identifiers remain, execution proceeds to step 370. At step 370, a trace starts based on the one or more automatically generated scripts that have been generated in connection with the previous steps. The traces that are executed in connection with the production application will generate log entries that should provide log outputs to enable application debugging and remediation. Finally, at step 372, these log outputs are displayed by the log viewer application so that dynamically generated application trace logs may be presented to a user who will then be provided with the information necessary to correct any defects in the application or otherwise to develop a workaround to fix the issues that had been identified with execution of the production application.

Figure 4:
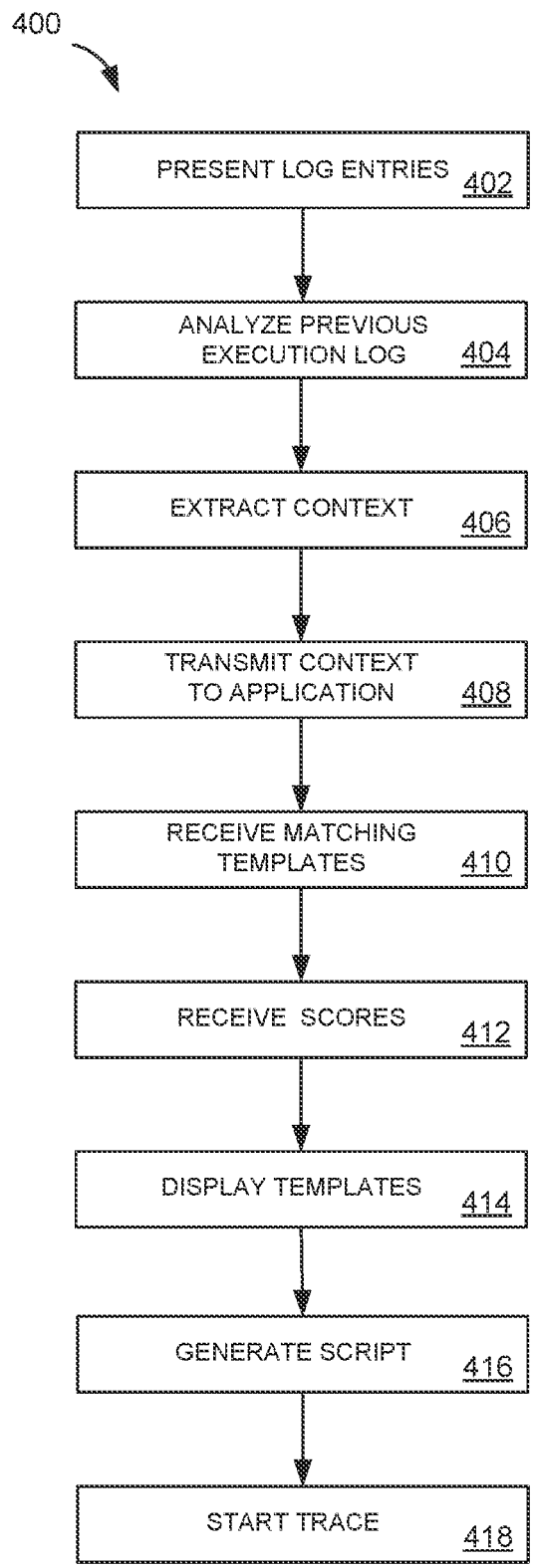
FIG. 4 is a flow diagram illustrating an example method for automatic generation of dynamic application trace logs consistent with various embodiments.

FIG. 4 is a flow diagram 400 illustrating an example method for automatic generation of dynamic application trace logs consistent with various embodiments. First, at step 402, a log viewer tool presents log entries based on an application execution log that was generated in connection with a prior execution of a running application. In some embodiments, in connection with the presented log entries, a user may select one or more segments of the application execution log that may be relevant to an issue that the user is attempting to debug or remediate. Next, at step 404, based on a selection of the user of one or more log segments, the previous execution log is analyzed to obtain context information associated with the one or more log segments. To obtain this context information an application execution log may be analyzed based on context information that may be extracted and sent via an API to a debugger script generating service to request methods that may be available for tracing. Such context information may include a class name associated with a class within a particular application. The context information may also include a tenant identifier, which may identify a tenant within a multitenant application. Finally, the context information may include a particular message.

Next, at step 406, the identified context information is extracted from the previous application execution log. In some embodiments, the extracted log context may be extracted into a list structure that may be used to iteratively process the extracted log contents. Next at step 408, the extracted context may be transmitted to the running application or to a trace repository that is associated with the running application, which trace repository manages trace logs associated with debugging scripts that are executed in connection with the running application.

Next, at step 410, based on the extracted log context, one or more debugging script templates may be received. In some embodiments, a service may receive a request for templates via an API used to request templates based on an execution log context. The service may then transmit the matching templates and a log viewer may receive the matching templates. In some embodiments, the templates are associated with relevance scores that may be generated in connection with the service that provides the matching templates. In some embodiments, the scores are transmitted in connection with the templates at the time the templates are received at step 410. In some other embodiments, the scores may be requested separately from the service, such that the corresponding template relevance scores may be requested by template identifier so that only certain template scores need be requested. In these embodiments, at step 412 corresponding template relevance scores may be received by the log viewer. Subsequently, at step 414 the templates may be displayed by the log viewer application so that a user may select a desired template for autogenerating a debug script. Once a template has been selected, the template may be applied at step 416 to automatically generate a debugging script. Finally, at step 418 a trace may be started in connection with the script that was generated at step 416, and an associated trace log may be generated and provided to the user so that the user may have additional information regarding execution of specific modules of the application that may be relevant to remediation of issues associated with the running application.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for automatic generation of dynamic application trace logs associated with a running application, the method comprising:
   presenting, by a log viewer, a plurality of application log entries associated with an application execution log, the application log having been generated in connection with a previous execution of an application;
   analyzing the application execution log to identify one or more application execution log context descriptors;
   extracting the one or more application execution log context descriptors from the application execution log;
   transmitting the one or more application execution log context descriptors to the running application;
   for each application execution log context descriptor, requesting, by the running application, one or more registered tracing templates for examining each application execution log context descriptor and returning the one or more tracing templates and an associated context relevance score;
   receiving from the running application the one or more tracing templates that match each of the one or more application execution log context descriptors;
   receiving, at the log viewer, the one or more tracing templates having the associated context relevance scores;
   displaying, by the log viewer, the one or more tracing templates based on the associated context relevance scores;
   generating an application debugging script based on the one or more tracing templates;
   starting an execution trace in connection with the running application based on the generated application debugging script; and
   transmitting a current application execution log based on the execution trace.

2. The non-transitory computer-readable media of claim 1, wherein the log viewer includes a log segment selection integration for selecting log segments to extract the one or more application execution log context descriptors.

3. The non-transitory computer-readable media of claim 1, wherein the one or more application execution log context descriptors comprises one or more of: a class name of a class within a module in the running application; a tenant identifier associated with a tenant in the running application; and a message associated with the running application.

4. The non-transitory computer-readable media of claim 1, wherein the method further comprises:
   in response to determining that no context information can be extracted from a selected log segment in the plurality of application log entries, raising an error condition.

5. The non-transitory computer-readable media of claim 4, wherein the associated context relevance score is determined based on metadata associated with one or more annotations associated with source code of the running application.

6. The non-transitory computer-readable media of claim 1, wherein displaying, the one or more tracing templates based on the associated context relevance score comprises displaying the one or more tracing templates by descending context relevance score.

7. A method for automatic generation of dynamic application trace logs associated with a running application, the method comprising:
- presenting, by a log viewer, a plurality of application log entries associated with an application execution log, the application log having been generated in connection with a previous execution of an application;
- analyzing the application execution log to identify one or more application execution log context descriptors;
- extracting the one or more application execution log context descriptors from the application execution log;
- transmitting the one or more application execution log context descriptors to the running application;
- for each application execution log context descriptor, requesting, by the running application, one or more registered tracing templates for examining each application execution log context descriptor and returning the one or more tracing templates and an associated context relevance score;
- receiving from the running application the one or more tracing templates that match each of the one or more application execution log context descriptors;
- receiving, at the log viewer, the one or more tracing templates having the associated context relevance scores;
- displaying, by the log viewer, the one or more tracing templates based on the associated context relevance scores;
- generating an application debugging script based on the one or more tracing templates;
- starting an execution trace in connection with the running application based on the generated application debugging script; and
- transmitting a current application execution log based on the execution trace.

8. The method of claim 7, wherein the log viewer includes a log segment selection integration for selecting log segments to extract the one or more application execution log context descriptors.

9. The method of claim 8, wherein the one or more application execution log context descriptors comprises one or more of: a class name of a class within a module in the running application; a tenant identifier associated with a tenant in the running application; and a message associated with the running application.

10. The method of claim 7, further comprising:
- in response to determining that no context information can be extracted from a selected log segment in the plurality of application log entries, raising an error condition.

11. The method of claim 10, wherein the associated context relevance score is determined based on metadata associated with one or more annotations associated with source code of the running application.

12. The method of claim 7, wherein the associated context relevance score is determined based on metadata associated with one or more annotations associated with source code of the running application.

13. A system for automatic generation of dynamic application trace logs associated with a running application, the system comprising:
- at least one processor;
- and at least one non-transitory memory storing computer executable instructions that when executed by the at least one processor cause the system to carry out actions comprising:
- presenting, by a log viewer, a plurality of application log entries associated with an application execution log, the application log having been generated in connection with a previous execution of an application;
- analyzing the application execution log to identify one or more application execution log context descriptors;
- extracting the one or more application execution log context descriptors from the application execution log;
- transmitting the one or more application execution log context descriptors to the running application;
- for each application execution log context descriptor, requesting, by the running application, one or more registered tracing templates for examining each application execution log context descriptor and returning the one or more tracing templates and an associated context relevance score;
- receiving from the running application the one or more tracing templates that match each of the one or more application execution log context descriptors;
- receiving, at the log viewer, the one or more tracing templates having the associated context relevance scores;
- displaying, by the log viewer, the one or more tracing templates based on the associated context relevance scores;
- generating an application debugging script based on the one or more tracing templates;
- starting an execution trace in connection with the running application based on the generated application debugging script; and
- transmitting a current application execution log based on the execution trace.

14. The system of claim 13, wherein the log viewer includes a log segment selection integration for selecting log segments to extract the one or more application execution log context descriptors.

15. The system of claim 13, wherein the one or more application execution log context descriptors comprises one or more of: a class name of a class within a module in the running application; a tenant identifier associated with a tenant in the running application; and a message associated with the running application.

16. The system of claim 13, wherein the actions further comprise:
- in response to determining that no context information can be extracted from a selected log segment in the plurality of application log entries, raising an error condition.

17. The system of claim 16, wherein the associated context relevance score is determined based on metadata associated with one or more annotations associated with source code of the running application.

* * * * *